(12) United States Patent
Kuwahara

(10) Patent No.: US 11,407,258 B2
(45) Date of Patent: Aug. 9, 2022

(54) PNEUMATIC TIRE

(71) Applicant: THE YOKOHAMA RUBBER CO., LTD., Tokyo (JP)

(72) Inventor: Noboru Kuwahara, Tokyo (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 0 days.

(21) Appl. No.: 16/765,845

(22) PCT Filed: Nov. 15, 2018

(86) PCT No.: PCT/JP2018/042295
§ 371 (c)(1),
(2) Date: May 20, 2020

(87) PCT Pub. No.: WO2019/098275
PCT Pub. Date: May 23, 2019

(65) Prior Publication Data
US 2020/0361248 A1 Nov. 19, 2020

(30) Foreign Application Priority Data

Nov. 20, 2017 (JP) .............................. JP2017-222402

(51) Int. Cl.
*B60C 13/00* (2006.01)
(52) U.S. Cl.
CPC .................. *B60C 13/001* (2013.01)
(58) Field of Classification Search
CPC ... B60C 13/001; B60C 13/02; B60C 152/523; B60C 152/524
See application file for complete search history.

(56) References Cited

U.S. PATENT DOCUMENTS 4,198,774 A * 4/1980 Roberts ..................... G09F 3/00
40/616
5,303,758 A * 4/1994 Clementz ............... B60C 13/001
152/523

(Continued)

FOREIGN PATENT DOCUMENTS

DE  696 13 993        4/2002
JP    08282215 A  * 10/1996

(Continued)

OTHER PUBLICATIONS

International Search Report for International Application No. PCT/JP2018/042295 dated Dec. 11, 2018, 3 pages, Japan.

*Primary Examiner* — Cedrick S Williams
(74) *Attorney, Agent, or Firm* — Thorpe North & Western

(57) ABSTRACT

Provided is a pneumatic tire with a side pattern including a ridge pattern region provided with first ridges extending continuously in one direction at an interval; and a marking display region bordering and being surrounded by the ridge pattern region, the marking display region displaying markings including one or more of a letter, a number, a symbol, and/or a figure. The marking display region includes: a bordering ridge that borders an outer edge of the markings; and second ridges provided in an inner region of the markings and extending continuously in one direction at an interval from each other. Ends of the first ridges and the second ridges are connected to the bordering ridge, and apexes of the first ridges and the second ridges are flush with and connected to an apex of the bordering ridge.

8 Claims, 8 Drawing Sheets

(56) References Cited

U.S. PATENT DOCUMENTS

| | | | |
|---|---|---|---|
| 5,645,661 A | 7/1997 | Clementz et al. | |
| 6,253,815 B1 * | 7/2001 | Kemp | B44F 1/02 |
| | | | 152/523 |
| 2002/0174928 A1 * | 11/2002 | Ratliff, Jr. | B60C 13/001 |
| | | | 152/555 |
| 2010/0051159 A1 * | 3/2010 | Fujioka | B60C 13/001 |
| | | | 152/523 |
| 2010/0258231 A1 * | 10/2010 | Nakamura | B60C 13/02 |
| | | | 152/523 |
| 2013/0228261 A1 | 9/2013 | Nakamura | |
| 2015/0367687 A1 * | 12/2015 | Kimura | B60C 13/001 |
| | | | 152/523 |
| 2016/0137007 A1 | 5/2016 | Murata | |

FOREIGN PATENT DOCUMENTS

| | | |
|---|---|---|
| JP | H08-282215 | 10/1996 |
| JP | H11-020416 | 1/1999 |
| JP | H11-291721 | 10/1999 |
| JP | 2004-224342 | 8/2004 |
| JP | 2008-137613 | 6/2008 |
| JP | 2010-064656 | 3/2010 |
| JP | 2015-000613 | 1/2015 |
| WO | WO 97/17217 | 5/1997 |
| WO | WO 2012/029239 | 3/2012 |
| WO | WO 2014/199731 | 12/2014 |

\* cited by examiner

PNEUMATIC TIRE

TECHNICAL FIELD

The present technology relates to a pneumatic tire including a sidewall portion provided with a side pattern.

BACKGROUND ART

In general, a sidewall portion of a pneumatic tire (hereinafter simply referred to as a "tire") is displayed with markings including a letter, a symbol, or a combination of the letter and the symbol, such as a trademark or a trade dress, including a letter, a number, a symbol, or a figure.

In the related art, to make these markings prominent, a ridge pattern region is often provided on a surface of a sidewall portion of a tire, the ridge pattern region being formed of a plurality of ridges provided extending in one direction at small intervals. The markings include an outer edge in contact with the ridge pattern region, and thus the markings are surrounded by the ridge pattern region.

With regard to a side pattern of the sidewall portion as described above, known examples include a tire in which markings such as a trademark or a trade dress, including a letter, a number, a symbol, or a figure, surrounded by a ridge pattern region, are less likely to crack, the markings being excellent in visibility (refer to Japan Unexamined Patent Publication No. H08-282215).

Specifically, small ridges that linearly extend parallel to or substantially parallel to adjacent ridges are provided on a surface of the markings of the side pattern of the tire at equal intervals in the circumferential direction. Intervals between the ridges are configured such that an interval between the ridges provided in a ridge pattern region surrounding markings is different from an interval between the ridges provided on the surface of the markings, and the interval between the ridges provided on the surface of the markings is smaller than the interval between the ridges provided in the ridge pattern region.

The tire described above can provide markings that are less likely to crack and that have improved visibility. Unfortunately, since the tire uses a plurality of ridges protruding to various heights to improve visibility, it has been found that these ridges impede a flow of air passing through the sidewall, i.e., the plurality of ridges having different heights cause air resistance, thereby affecting fuel economy when traveling on a vehicle. From these findings, it can be said that the tire cannot sufficiently accommodate demand for low fuel economy in recent years.

SUMMARY

The present technology provides a pneumatic tire having a side pattern provided with a ridge pattern region that can improve fuel economy without impairing visibility of markings displayed on a surface of a sidewall and impeding a flow of air passing through the sidewall.

An aspect of the present technology is a pneumatic tire having a sidewall portion provided with a side pattern.

The side pattern includes: a ridge pattern region provided with a plurality of first ridges extending continuously in one direction at an interval; and a marking display region bordering and being surrounded by the ridge pattern region, the marking display region displaying markings including a letter, a number, a symbol, a figure, or a combination of at least two of the letter, the number, the symbol, and the figure.

The marking display region includes: a bordering ridge that borders an outer edge of the markings; and a plurality of second ridges provided in an inner region of the markings and extending continuously in one direction at an interval from each other, ends of the plurality of first ridges and the plurality of second ridges being connected to the bordering ridge, and apexes of the plurality of first ridges and the plurality of second ridges being flush with and connected to an apex of the bordering ridge.

The apexes of the plurality of first ridges and the plurality of second ridges each have a smooth surface, and a width of the smooth surface of each one of the plurality of second ridges in a width direction orthogonal to an extending direction of the plurality of second ridges is wider than a width of the smooth surface of each one of the plurality of first ridges in a width direction orthogonal to an extending direction of the plurality of first ridges.

The apex of the bordering ridge has a smooth surface, and a width of the smooth surface of the bordering ridge in a width direction orthogonal to an extending direction of the bordering ridge is preferably wider than the width of each one of the plurality of second ridges.

The width of the smooth surface of the bordering ridge is preferably from 5 to 22.5 times the width of each one of the plurality of second ridges.

The plurality of second ridges preferably have a ridge interval wider than a ridge interval of the plurality of first ridges in the ridge pattern region.

The apex of the bordering ridge has a smooth surface, and the width of the smooth surface of the bordering ridge in the width direction orthogonal to the extending direction of the bordering ridge is preferably from 2 to 45% of a maximum peripheral dimension of the markings along a tire radial direction.

An extending direction of the plurality of first ridges and an extending direction of the plurality of second ridges are different from each other, and a difference in angle between the extending direction of the plurality of first ridges and the extending direction of the plurality of second ridges is preferably from 5 to 90 degrees.

The bordering ridge preferably includes a plurality of sets of two linear portions each extending straight in a linear shape and a corner portion interposed between the linear portions, the corner portion protruding outward of the markings, and a plurality of the corner portions each have a curved shape.

According to the pneumatic tire described above, even when the side pattern provided with the ridge pattern region is provided, fuel economy can be improved without impairing visibility of the markings displayed on the surface of the sidewall and impeding a flow of air passing through the sidewall.

DETAILED DESCRIPTION

Hereinafter, a pneumatic tire of the present embodiment will be described in detail.

In the present specification, "tire lateral direction" refers to the direction of the center axis of rotation of a pneumatic tire. "Tire circumferential direction" refers to a rotation direction in which a tread surface rotates, when the tire rotates about the center axis of rotation of the tire. "Tire radial direction" refers to the direction radiating from the center axis of rotation of the tire. "Outward in the tire radial direction" refers to the direction away from the tire rotation center axis. "Inward in the tire radial direction" refers to the direction towards the center axis of rotation of the tire.

Figure 1A:
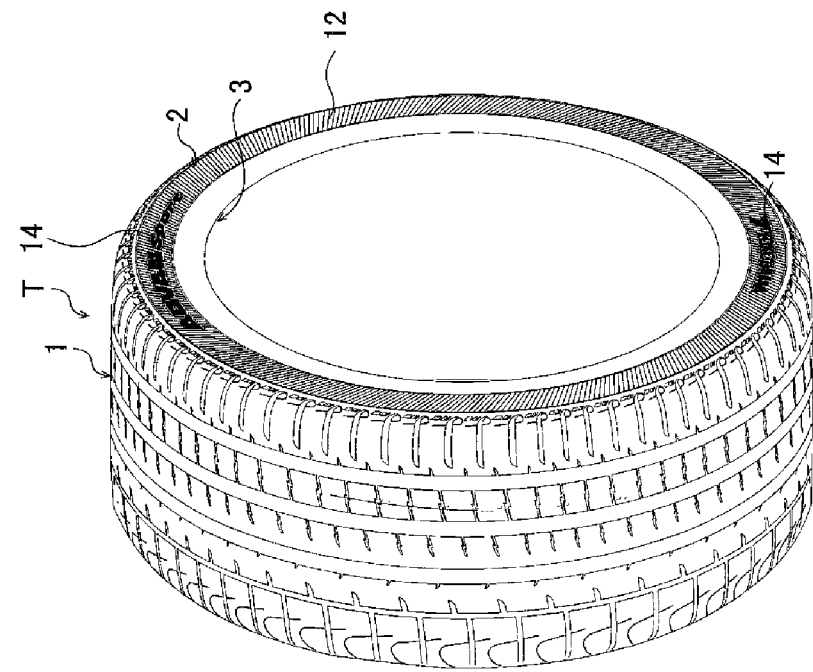
FIGS. 1A and 1B are each a perspective view of a pneumatic tire of an embodiment.
Figure 1B:
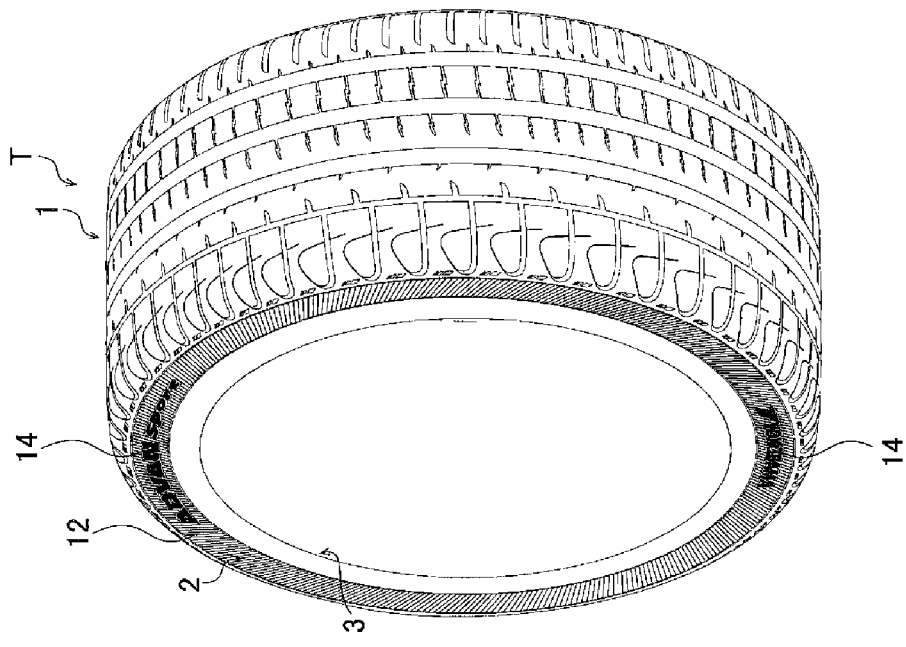
Figure 2:
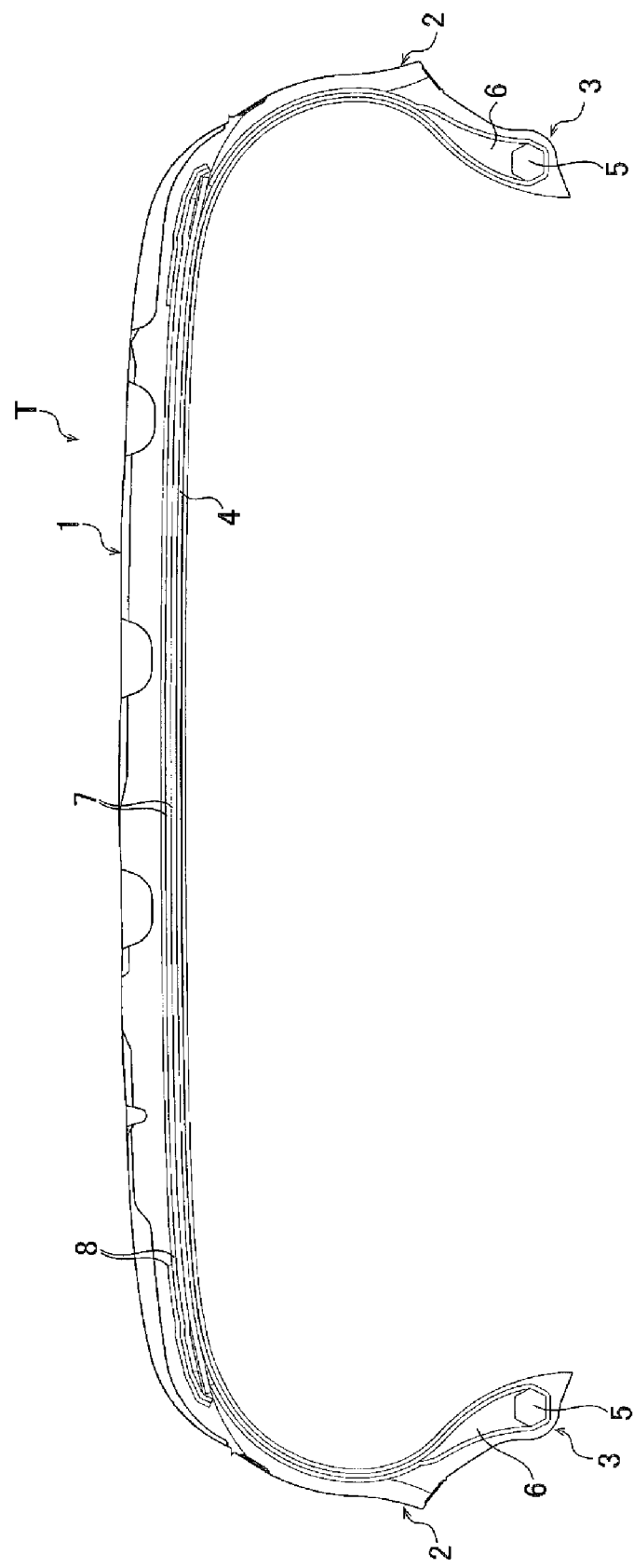
FIG. 2 is a profile cross-sectional view of the pneumatic tire illustrated in FIG. 1.

FIGS. 1A and 1B are each a perspective view of a pneumatic tire T of an embodiment. FIG. 2 is a profile cross-sectional view of the pneumatic tire T of an embodiment. The pneumatic tire T illustrated in each of FIGS. 1 and 2 includes an annular tread portion 1 extending in the tire circumferential direction, a pair of sidewall portions 2, 2 disposed on both sides of the tread portion 1, and a pair of bead portions 3, 3 disposed inward of the corresponding sidewall portions 2 in the tire radial direction.

A carcass layer 4 is mounted between the pair of bead portions 3, 3. The carcass layer 4 includes a plurality of reinforcing cords extending in the tire radial direction and is folded back around bead cores 5 disposed in each of the bead portions 3 from a tire inner side to a tire outer side. A bead filler 6 extending radially outward, having a triangular cross-sectional shape, formed from a rubber composition, is disposed on the outer circumference of the bead core 5.

Two belt layers 7 are embedded radially outward of the carcass layer 4 in the tread portion 1. The belt layers 7 each include a plurality of reinforcing cords that are inclined with respect to the tire circumferential direction, the reinforcing cords being arranged in the different layers in a criss-cross manner. In the belt layers 7, the inclination angle of the reinforcing cords with respect to the tire circumferential direction ranges from, for example, 10° to 40°. Steel cords are preferably used as the reinforcing cords of the belt layers 7. To improve high-speed durability, two belt cover layers 8 are disposed radially outward of the belt layer 7, the two belt cover layers 8 being each formed by arraying reinforcing cords at an angle of 5° or less, for example, from the tire circumferential direction. Nylon, aramid, or similar organic fiber cords are preferably used as the reinforcing cords of the belt cover layers 8.

Note that the tire internal structure described above represents a typical example for a pneumatic tire, and the pneumatic tire is not limited thereto.

Figure 3:
FIG. 3 is a diagram illustrating an example of a side pattern of a pneumatic tire T.

FIG. 3 is a diagram illustrating an example of a side pattern 10 of the pneumatic tire T. The pneumatic tire T having the side pattern 10 may be suitably used as a tire for a passenger vehicle.

As illustrated in FIG. 1, the side pattern 10 includes a ridge pattern region 12 and a marking display region 14.

The ridge pattern region 12 is provided with a plurality of first ridges 12A (refer to FIG. 4) extending continuously in one direction at an interval. The first ridges 12A extend continuously in one direction while being parallel to each other or substantially parallel (±1 degree or less) to each other.

The markings display area 14 is displayed with markings surrounded by the ridge pattern region 12, including a letter, a number, a symbol, a figure, or a combination of at least two of the letter, the number, the symbol, and the figure. The markings display area 14 borders the ridge pattern region 12.

In the example illustrated in FIGS. 1A and 1B, the ridge pattern region 12 is provided in an annular shape in the sidewall throughout a circumference of the sidewall. The ridge pattern region 12 extends in the tire circumferential direction with a predetermined width in a radially outward portion in the sidewall facing in the tire lateral direction. The ridge pattern region 12 surrounds peripheries of a deformed letter "y" symbol, respective letters of "YOKOHAMA", respective letters of "ADVAN" (trade name), and respective letters of "sport".

Figure 4:
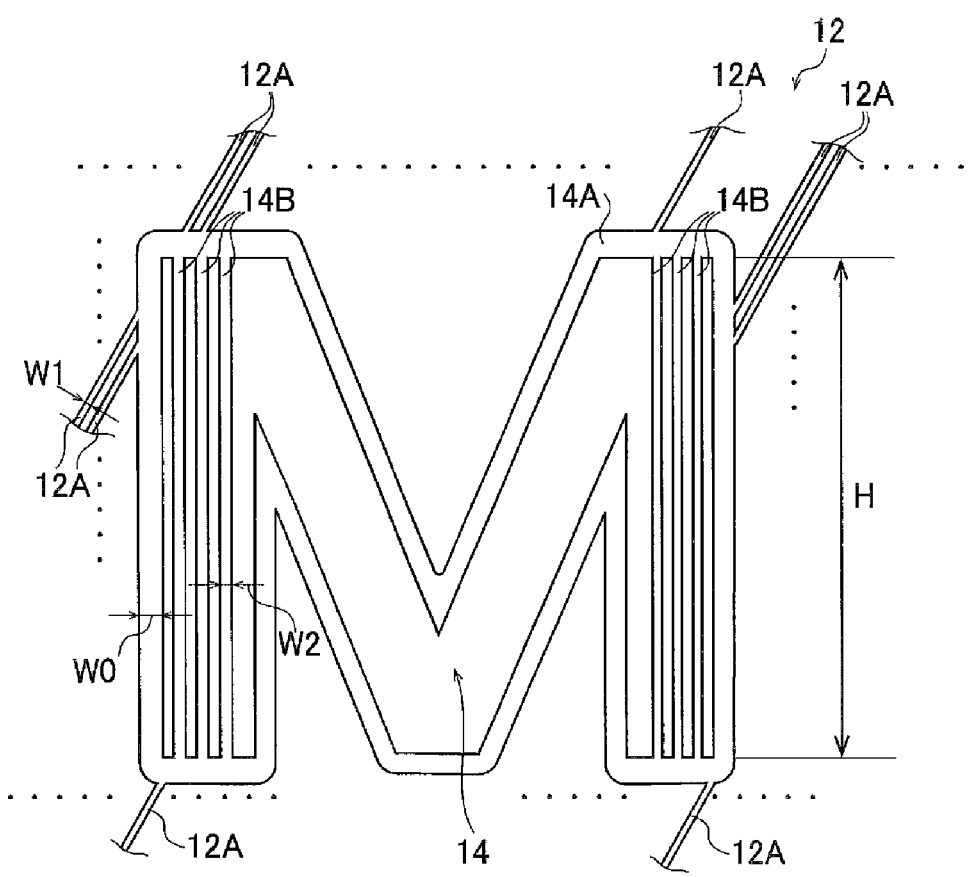
FIG. 4 is a diagram illustrating markings in an enlarged manner, the markings indicated in a marking display region, and a ridge pattern region therearound in a pneumatic tire of an embodiment.

FIG. 4 is a diagram illustrating a marking of a letter of "M" in an enlarged manner as an example indicated in the marking display region 14 and the ridge pattern region 12 therearound. The marking display region 14 includes a bordering ridge 14A that rims an outer edge of the markings, and a plurality of second ridges 14B provided in an internal region of the markings, extending continuously in one direction while being spaced each other. Ends of the first ridges 12A and the second ridges 14B are connected to the bordering ridge 14A. Apexes of the first ridges 12A and the second ridges 14B are flush with and connected to an apex of the bordering ridge 14A. Here, when the cross-sectional shape of each one of the ridges has the shape of a trapezoid, each one of the apexes includes a portion of the upper side of the trapezoid. When the cross-sectional shape thereof is a pseudo-trapezoid shape with a curved upper side, each one of the apexes also includes the curved upper side. "Flush with" refers to a state of the first ridges 12A, the bordering ridge 14A, and the second ridges 14B being smoothly continued, without having a step of 0.1 mm or more. A step of less than 0.1 mm is within a range of tolerance of the "flush with".

As described above, the apexes of the first ridges 12A, the bordering ridge 14A, and the second ridges 14B are flush with each other, so that a flow of air passing through the sidewall is not impeded without impairing visibility of the markings, thereby contributing to improvement in fuel economy.

Figure 5:
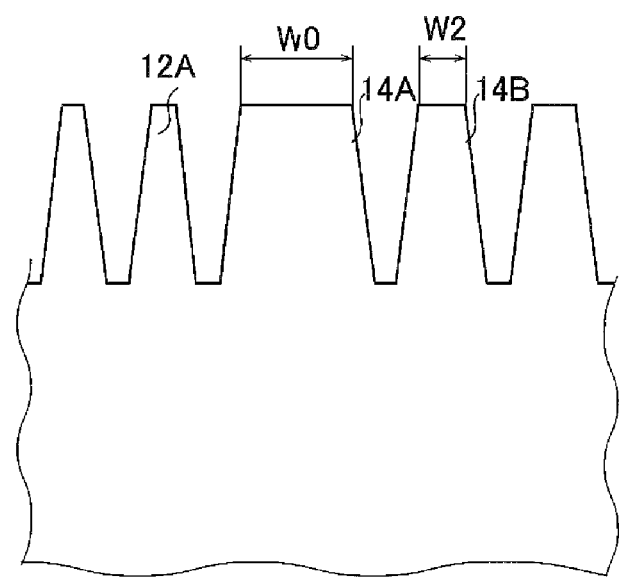
FIG. 5 is a diagram illustrating an example of a cross section of each of a first ridge, a bordering ridge, and a second ridge in a pneumatic tire of an embodiment.

FIG. 5 is a diagram illustrating an example of a cross section of each of the first ridge 12A, the bordering ridge 14A, and the second ridge 14B. The cross section of each of the first ridge 12A, the bordering ridge 14A, and the second ridge 14B is in the shape of a trapezoid, and the apexes thereof have smooth surfaces. At this time, the smooth surface of the second ridge 14B preferably has a width W2 wider than a width W1 of the smooth surface of the first ridge 12A (refer to FIG. 4). This indicates the relationship, width W2>width W1. Accordingly, as illustrated in FIG. 3, the second ridge 14B is emphasized compared to the first ridge 12A to easily identify the markings from the ridge pattern region 12, so that the markings are improved in visibility. In the example illustrated in FIG. 3, the width W2 (refer to FIGS. 4 and 5) of the smooth surface of the second ridge 14B in a width direction orthogonal to an extending direction of the second ridge 14B is equal in any of the second ridges 14B, and the width W1 (refer to FIG. 4) of the smooth surface of the first ridge 12A in a width direction orthogonal to an extending direction of the first ridge 12A is equal in any of the first ridges 12A.

As illustrated in FIG. 5, the apex of the bordering ridge 14A has a smooth surface. At this time, the smooth surface of the bordering ridge has a width W0 in a width direction orthogonal to an extending direction of the bordering ridge 14A, the width W0 being preferably wider than the width W2 of the second ridge 14B. This causes an edge of the markings to be clear as illustrated in FIG. 2, so that the markings can be easily identified from the ridge pattern region 12.

Thus, the relationship, width W0>width W2>width W1, is preferable.

In addition, the width W0 of the smooth surface of the bordering ridge 14A is preferably from 5 to 22.5 times the width W2 of the second ridge 14B. Setting the width W0 to from 5 to 22.5 times the width W2 causes the edge of the markings to be clear, so that the visibility of the markings can be improved. This also enables improvement in fuel economy. Setting the width W0 to from 5 to 12.5 times the width W2 enables visibility of the markings to be further improved.

Additionally, the second ridges 14B preferably have a ridge interval wider than a ridge interval of the first ridges 12A in the ridge pattern region 12. As illustrated in FIG. 3, the second ridges 14B disposed at a loose interval can be easily identified from the first ridges 12A that are densely disposed, and thus the markings can be easily identified from the ridge pattern region 12. In the example illustrated in FIG. 3, the ridge interval of the second ridges 14B is equal in any pair of the second ridges 14B adjacent to each other, and the ridge interval of the first ridges 12A is equal in any pair of the first ridges 12A adjacent to each other.

As illustrated in FIG. 5, the apex of the bordering ridge 14A has a smooth surface. At this time, the width W0 of the smooth surface of the bordering ridge 14A is preferably from 2 to 45% of a maximum peripheral dimension (hereinafter referred to simply as a maximum dimension) H of the markings along the tire radial direction. The maximum dimension H along the tire radial direction of the markings is a maximum dimension of a region provided with the second ridges 14B, inside the bordering ridge 14A, along a sidewall surface, as described in the example illustrated in FIG. 4. When the width W0 is less than 2% of the maximum dimension H, an area occupied by the bordering ridge 14A is small, and thus improvement in visibility of the markings due to bordering is reduced. When the width W0 exceeds 45% of the maximum dimension H, an area occupied by the bordering ridge 14A is large. Thus, it becomes difficult to identify the shape of the markings, and their significance as markings is reduced. When the width W0 is increased while the maximum dimension H is maintained, an area of the ridge pattern region 12 (a width of a radially outward and inward region) is reduced. In a vulcanization step during manufacturing of a tire, the ridge pattern region 12 functions as a portion producing a path for air to escape existing between the tire and a tire mold, the tire expanding in the tire mold and being pressed against an inner surface of the tire mold. However, when an area of the ridge pattern region 12 is reduced, the function of allowing air to escape is deteriorated, and thus vulcanization failures (insufficient vulcanization portions) are likely to occur. From this point, the width W0 is preferably equal to or less than 45% of the maximum dimension H.

Figure 6:
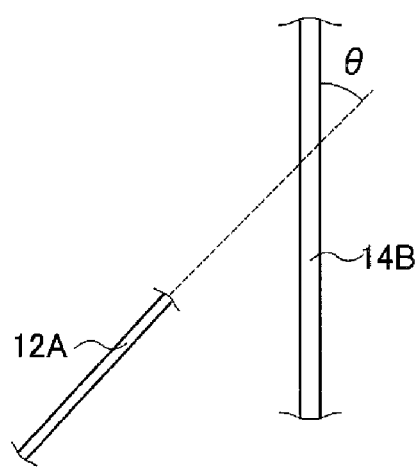
FIG. 6 is a diagram illustrating an angle difference θ between an extending direction of the first ridge and an extending direction of the second ridge in a pneumatic tire of an embodiment.

FIG. 6 is a diagram illustrating an angle difference $\theta$ between the extending direction of the first ridge 12A and the extending direction of the second ridge 14B. As illustrated in FIG. 6, the extending direction of the first ridge 12A and the extending direction of the second ridge 14B are different from each other. At this time, the angle difference $\theta$ between the extending direction of the first ridge 12A and the extending direction of the second ridge 14B is preferably from 5 to 90 degrees. The angle difference $\theta$ is more preferably from 30 to 60 degrees. In the case of the first ridge 12A and the second ridge 14B illustrated in FIG. 3 in which the angle difference $\theta$ is within the range described above, the second ridge 14B and the first ridge 12A can be easily differentiated from each other. This contributes to improvement in visibility of the markings.

As in the marking "M" illustrated in FIG. 4, the bordering ridge 14A includes a plurality of sets of two linear portions each extending straight in a linear shape and a corner portion interposed between the linear portions, the corner portion protruding outward of the markings. In this case, each of a plurality of the corner portions is preferably curved as illustrated in FIG. 4. When the corner portions protruding outward are each formed in a curved shape, the curved shape can be made prominent with respect to the first ridges 12A each extending in a linear shape. This contributes to improvement in visibility of the markings.

Experiment 1

To investigate effects of the present embodiment, a plurality of the tires T (tire size: 295/35ZR20 (101 Y)) different in the side pattern 10 were produced. Changes in the visibility of markings and fuel economy based on air resistance were evaluated by varying a width of the bordering ridge 14A while shapes and dimensions of the first ridges 12A and second ridges 14B of the side pattern 10 were fixed.

The first ridges 12A each had the width W1 fixed to 0.4 mm, a ridge interval of the first ridges 12A was fixed to 0.6 mm, and an extending direction of each one of the first ridges 12A was fixed at approximately 45 degrees from the tire circumferential direction.

The second ridges 14B each had the width W2 fixed to 0.4 mm, a ridge interval of the second ridges 14B was fixed to 0.6 mm, and an extending direction of each one of the second ridges 14B was fixed at approximately 90 degrees from the tire circumferential direction.

The markings had a maximum dimension H fixed to 16 mm.

Figure 7A:
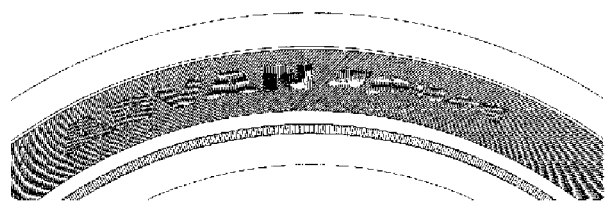
FIGS. 7A to 7C are diagrams illustrating examples of respective three forms of side patterns in a pneumatic tire of an embodiment.
Figure 7B:
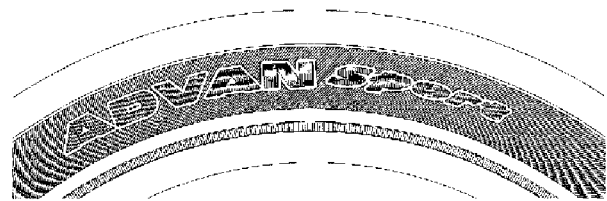
Figure 7C:
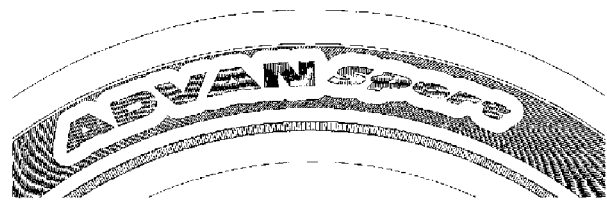

FIGS. 7A to 7C are diagrams illustrating examples of respective forms of three side patterns in which the bordering ridges 14A are varied in width.

Evaluation of the side pattern 10 was performed based on visibility and fuel economy of the markings.

The visibility of the markings was evaluated such that before a tire T was mounted on a vehicle, the side pattern 10 of the tire T was shown to ten panelists to evaluate whether the markings could be visually identified. This evaluation was sorted by levels from 1 to 3. Of the levels, level 1 is difficult to be visually identified, level 3 is easy to be visually identified, and level 2 can be visually identified with effort. The visibility was evaluated by calculating an average value of evaluations of the ten panelists. Thus, higher levels indicate greater visibility. An average value of 2.5 or more is a passing level for visibility.

In addition, four tires T each having the bordering ridge 14A with the same width W0 were mounted on a passenger vehicle, and the passenger vehicle was driven at a speed of 60 km/h. Then, a travel distance for a unit volume of fuel was calculated from an amount of fuel consumption at a travel distance of 240 km. The calculated travel distance was expressed as an index value with a travel distance of Comparative Example 1 shown in Table 1 below being assigned as a reference value (value of 100). This index value is referred to as a fuel consumption index. A higher fuel consumption index indicates lower fuel consumption.

Table 1 below indicates specifications of Comparative Examples and Examples along with evaluation results of the examples.

Comparative Examples 1, 2 each indicate "step (0.5 mm)" that means the bordering ridge 14A having an apex protruding by 0.5 mm from apexes of the first ridges 12A and the second ridges 14B.

TABLE 1

|  | First ridge 12A, bordering ridge 14A, and second ridge 14B, being flush or having step | Width W0 of bordering ridge 14A (mm) | Visibility | Fuel economy index |
|---|---|---|---|---|
| Comparative Example 1 | Step (0.5 mm) | 2 | 2.6 | 100 |
| Comparative Example 2 | Step (0.2 mm) | 2 | 2.6 | 101 |
| Comparative Example 3 | First ridge 12A and bordering ridge 14A being flush (Without bordering ridge 14A) | 0 | 1.8 | 98 |
| Example 1 | Flush | 0.4 | 2.5 | 103 |
| Example 2 | Flush | 2 | 2.8 | 104 |
| Example 3 | Flush | 5 | 2.7 | 104 |
| Example 4 | Flush | 9 | 2.6 | 103 |
| Example 5 | Flush | 10 | 2.5 | 102 |

A comparison among Comparative Examples 1 to 3 and Example 2 shows that fuel economy is improved without impairing the visibility of the markings displayed on the sidewall surface when the first ridges 12A, the bordering ridge 14A, and the second ridges 14B, are flush with each other and when the bordering ridge 14A is provided.

From Examples 1 to 5, the bordering ridge having the width W0 of 2% (=0.4 mm/20 mm) or more and 45% (=9 mm/20 mm) or less of the maximum dimension H of the markings is preferable in that visibility of the markings and superior fuel economy can be achieved.

Experiment 2

To investigate effects of the present embodiment, a plurality of the tires T (tire size: 295/35ZR20 (101 Y)) different in the side pattern 10 were produced. The apexes of the first ridges 12A, the apex of the bordering ridge 14A, and the apexes of the second ridges 14B were flush with each other. The markings had the maximum dimension H of 20 mm, and the bordering ridge 14A had the width W0 fixed to 2 mm. In the side pattern 10, the visibility of the markings described above and the fuel economy described above were evaluated by varying a ridge interval of the first ridges 12A and that of the second ridges 14B; and the angle difference θ between the extending direction of the first ridges 12A and that of the second ridges 14B, while fixing the width W1 of the first ridge 12A and the width W2 of the second ridge 14B to 0.7 mm and 0.4 mm, respectively.

Figure 8A:
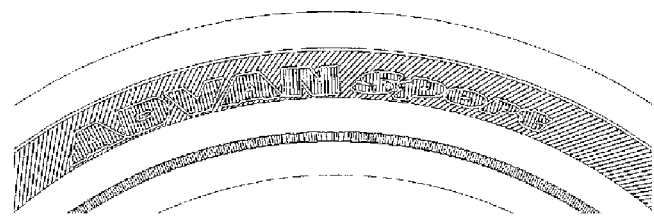
FIGS. 8A to 8C are diagrams illustrating other examples of respective three forms of side patterns in a pneumatic tire of an embodiment.
Figure 8B:
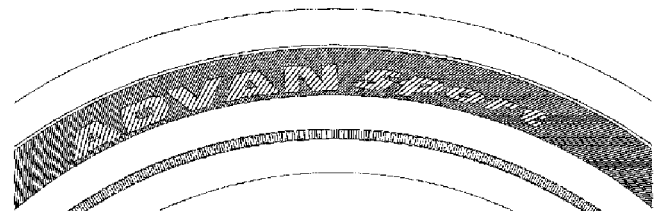
Figure 8C:
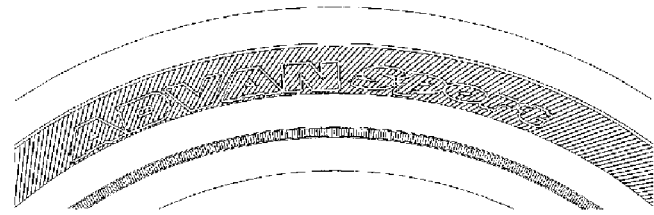

FIGS. 8A to 8C are diagrams illustrating examples of respective forms of three side patterns.

The form illustrated in FIG. 8A has a ridge interval of the first ridges 12A and a ridge interval of the second ridges 14B, being set to 1.0 mm; and the angle difference θ set to 45 degrees. The form illustrated in FIG. 8B has a ridge interval of the first ridges 12A set densely (0.6 mm), a ridge interval of the second ridges 14B set loosely (1.0 mm); and the angle difference θ set to 0 degrees. The form illustrated in FIG. 8C has a ridge interval of the first ridges 12A and a ridge interval of the second ridges 14B, being set to 1.0 mm; and the angle difference θ set to 0 degrees.

Table 2 below indicates specifications of Examples along with evaluation results of the examples. The form illustrated in FIG. 8A is the form of Example 9, the form illustrated in FIG. 8B is the form of Example 8, and the form illustrated in FIG. 8C is the form of Example 6.

TABLE 2

|  | Ridge interval of first ridges 12A (mm) | Ridge interval of second ridges 14B (mm) | Angle difference θ (degree) | Visibility | Improvement in fuel economy |
|---|---|---|---|---|---|
| Example 6 | 1 mm | 1 mm | 0 degrees | 2.5 | 105 |
| Example 7 | 1 mm | 0.6 mm | 0 degrees | 2.5 | 105 |
| Example 8 | 0.6 mm | 1 mm | 0 degrees | 2.7 | 105 |
| Example 9 | 1 mm | 1 mm | 45 degrees | 2.7 | 105 |
| Example 10 | 1 mm | 0.6 mm | 45 degrees | 2.7 | 105 |
| Example 11 | 0.6 mm | 1 mm | 45 degrees | 2.8 | 105 |

As can be seen from a comparison among Examples 6 to 11, the angle difference θ set other than zero is preferable in terms of improving the visibility. It can also be seen that setting the ridge interval of the second ridges 14B to be wider than the ridge interval of the first ridges 12A is preferable in terms of improving the visibility.

While the pneumatic tire according to the embodiments of the present technology is described above in detail, the present technology is not limited to the above embodiments and may be improved or modified in various ways within a range without departing from the essence of the present technology as a matter of course.

The invention claimed is:

1. A pneumatic tire with a sidewall portion provided with a side pattern, the side pattern comprising:
   a ridge pattern region provided with a plurality of first ridges extending continuously in one direction at a first pitch; and
   a marking display region bordering and being surrounded by the ridge pattern region, the marking display region displaying markings including a letter, a number, a symbol, a figure, or a combination of at least two of the letter, the number, the symbol, or the figure;
   the marking display region including:
   a bordering ridge that borders an outer edge of the markings and
   a plurality of second ridges provided in an inner region of the markings and extending continuously in one direction at a second pitch,
   ends of the plurality of first ridges and the plurality of second ridges being connected to the bordering ridge, and apexes of the plurality of first ridges and the plurality of second ridges being flush with and connected to an apex of the bordering ridge;
   the second pitch being wider than the first pitch; and
   a spacing between bases of adjacent ridges of the plurality of first ridges and a spacing between bases of adjacent ridges of the plurality of second ridges being the same; wherein
   the apexes of the plurality of first ridges and the plurality of second ridges each have a smooth surface,
   a width of the smooth surface of each one of the plurality of second ridges in a width direction orthogonal to an extending direction of the plurality of second ridges is wider than a width of the smooth surface of each one of the plurality of first ridges in a width direction orthogonal to an extending direction of the plurality of first ridges,
   the apex of the bordering ridge has a smooth surface,
   a width of the smooth surface of the bordering ridge in a width direction orthogonal to an extending direction of the bordering ridge is wider than the width of each one of the plurality of second ridges, and
   the width of the smooth surface of the bordering ridge is from 7 to 22.5 times the width of each one of the plurality of second ridges.

2. The pneumatic tire according to claim 1, wherein
   the apex of the bordering ridge has a smooth surface, and
   the width of the smooth surface of the bordering ridge in the width direction orthogonal to the extending direction of the bordering ridge is from 2 to 45% of a maximum peripheral dimension of the markings along a tire radial direction.

3. The pneumatic tire according to claim 1, wherein
   an extending direction of the plurality of first ridges and an extending direction of the plurality of second ridges are different from each other, and
   a difference in angle between the extending direction of the plurality of first ridges and the extending direction of the plurality of second ridges is from 5 to 90 degrees.

4. The pneumatic tire according to claim 1, wherein the bordering ridge includes a plurality of sets of two linear portions each extending straight in a linear shape and a corner portion interposed between the linear portions, the corner portion protruding outward of the markings, and
   a plurality of the corner portions each have a curved shape.

5. The pneumatic tire according to claim 1, wherein a spacing between a base of the bordering ridge and a base of an adjacent ridge of the plurality of first ridges or the plurality of second ridges is the same as the spacing between the bases of the adjacent ridges of the plurality of first ridges and the spacing between bases of adjacent ridges of the plurality of second ridges.

6. The pneumatic tire according to claim 1, wherein
   the apex of the bordering ridge has a smooth surface, and
   the width of the smooth surface of the bordering ridge in the width direction orthogonal to the extending direction of the bordering ridge is from 2 to 45% of a maximum peripheral dimension of the markings along a tire radial direction.

7. The pneumatic tire according to claim 6, wherein
   an extending direction of the plurality of first ridges and an extending direction of the plurality of second ridges are different from each other, and
   a difference in angle between the extending direction of the plurality of first ridges and the extending direction of the plurality of second ridges is from 5 to 90 degrees.

8. The pneumatic tire according to claim 7, wherein the bordering ridge includes a plurality of sets of two linear portions each extending straight in a linear shape and a corner portion interposed between the linear portions, the corner portion protruding outward of the markings, and
   a plurality of the corner portions each have a curved shape.

* * * * *